United States Patent
Knapp et al.

[15] 3,638,140
[45] Jan. 25, 1972

[54] LASER-COOLING SYSTEM

[72] Inventors: Christopher F. Knapp, Hollywood; Peter S. Ozzimo, Hawthorne, both of Calif.

[73] Assignee: Hughes Aircraft Company, Culver City, Calif.

[22] Filed: July 28, 1969

[21] Appl. No.: 845,335

[52] U.S. Cl. ............................331/94.5, 165/107, 165/122
[51] Int. Cl. ..........................................H01s 3/02, H01s 3/04
[58] Field of Search ..........................331/94.5; 165/107, 122

[56] References Cited

UNITED STATES PATENTS

| 3,135,321 | 6/1964 | Butt et al. | 165/154 |
| 2,445,582 | 7/1948 | Melville | 250/27.5 |
| 3,487,328 | 12/1969 | Katz | 331/94.5 |

*Primary Examiner*—Ronald L. Wibert
*Assistant Examiner*—R. J. Webster
*Attorney*—James K. Haskell and Walter J. Adam

[57] ABSTRACT

A minimum volume and weight, integrated laser-cooler system comprising a single integrated unit enclosing a closed loop containing a primary coolant fluid. The loop includes a flowing coolant, a laser cavity, a primary coolant circulator and a coolant heat exchanger all in close proximity in concentric, coaxial, parallel or orthogonal configurations within a continuous housing enclosing the laser-cooler system module.

PATENTED JAN 25 1972

INVENTORS.
CHRISTOPHER F. KNAPP,
PETER S. OZZIMO,
BY
J.K. Haskell
ATTORNEY.

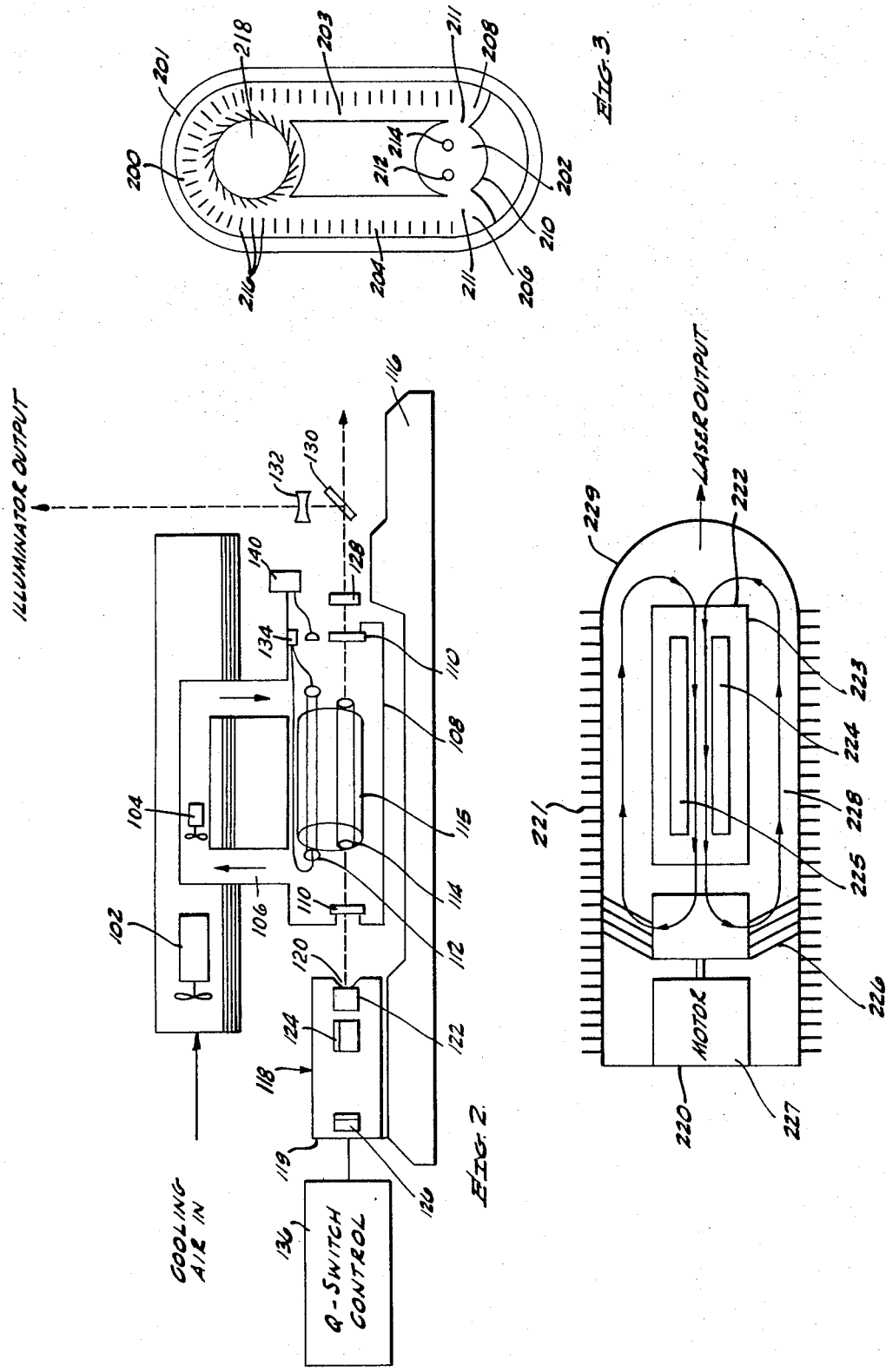

LASER-COOLING SYSTEM

BACKGROUND OF THE INVENTION

1. Field Of The Invention

The present invention relates to a laser cooling system, and more particularly, this invention relates to a closed loop cooling system for high repetition rate lasers.

2. Description of the Prior Art

Considerable thermal energy is developed from light-pumped lasers. If any repetition rate is experienced the thermal energy must be removed from the laser cavity since it interferes with the alignment and operation of the laser device. The cooling systems heretofore available have not been sufficiently compact or light weight for convenient incorporation in hand-held or portable units.

OBJECTS AND SUMMARY OF THE INVENTION

It is therefore an object of this invention to provide a minimum weight, volume, and maintenance yet maximum reliability laser-cooler module device.

Another object of the invention is the provision of a laser transmitter device combining cooling pumping, heat exchange and a laser cavity in a single minimum weight and volume, structurally rugged unit.

A further object of the invention is to provide a high repetition rate laser capable of exhibiting improved reliability, maintainability, weight, volume and efficiency as compared to other cooled high repetition rate laser devices.

A still further object of the invention is to simplify the design, construction and operation of coolant cooled laser systems.

These and other objects and many attendant advantages of the invention will become apparent as the description proceeds.

A laser system according to the invention generally comprises a closed coolant circulatory loop, a laser cavity forming one portion of the loop and an annular coolant heat exchanger forming another portion of the loop. Coolant circulation means including an impeller extending into the loop adjacent an end of the annular heat exchanger are disposed concentrically within the core of the heat exchanger. In a preferred modular form of the invention, the laser cavity and heat exchanger recess and connecting portions forming the closed loop are formed in a single unitary housing. Auxiliary thermal heat removal means such as fins can be associated with the exterior of the coolant heat exchanger.

The invention will now become better understood by reference to the following detailed description when considered in connection with the accompanying drawings.

BRIEF DESCRIPTION OF THE DRAWINGS

FIG. 2 is a schematic representation of the optical and thermal control components of another embodiment of the laser-cooler system of the invention; and FIG. 3 is a cross section view of one embodiment of the invention incorporating transverse flow through the laser cavity;

FIG. 4 is a cross section view of one embodiment of the invention incorporating an in-line configuration for the laser-cooler elements.

DESCRIPTION OF THE PREFERRED EMBODIMENTS

Figure 1:
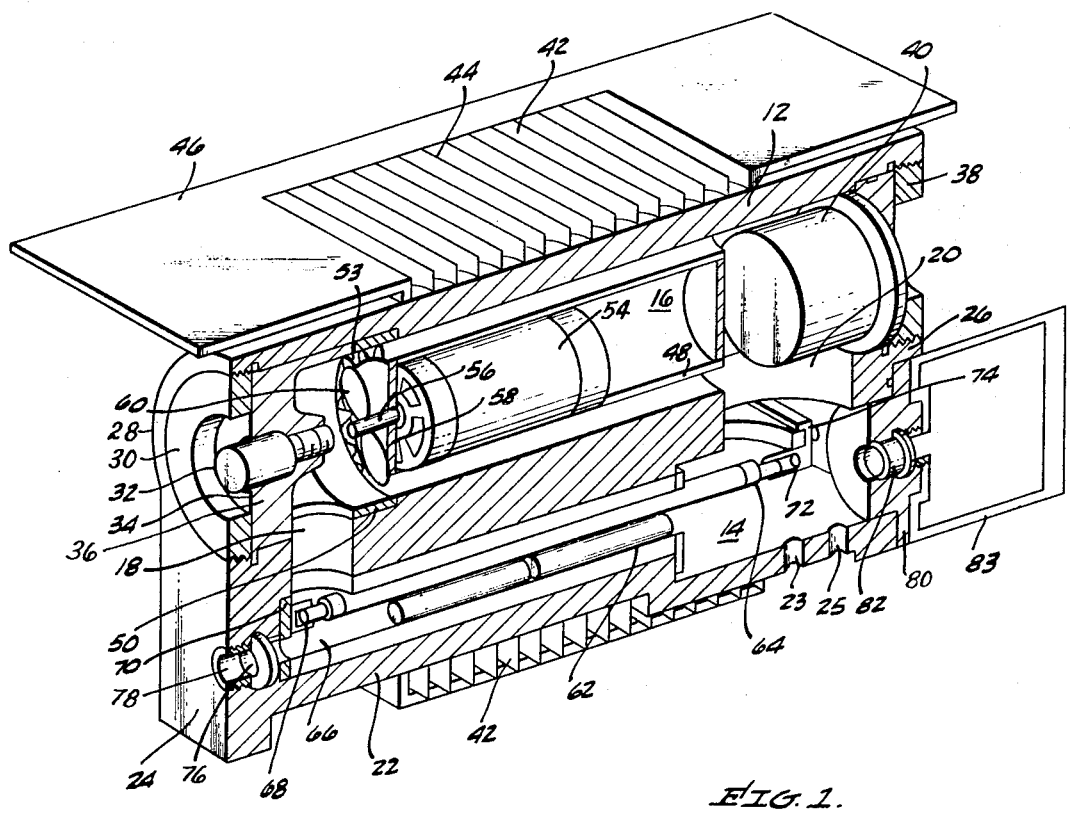
FIG. 1 is a cross section view in perspective of a laser-cooler module device according to the invention.

Referring now to FIG. 1, one embodiment of a laser-cooler module is illustrated. The module is formed of a housing 12 including a longitudinal laser cavity 14, a longitudinal heat exchanger recess 16 and two internal vertical passages 18 and 20 joining the ends of the recess 16 and cavity 14 into a closed loop.

The housing is preferably formed of a good heat conductor such as metal and can be fabricated as an integral cast member containing a bottom wall 22, two end walls 24, 26 and two sidewalls. The bottom wall may contain a coolant release valve 23 and a coolant fill valve 25. The upper portion of the sidewalls are each rounded to form a cylindrical top section 28 surrounding the heat exchange recess 16.

The exterior of the housing in the vicinity of the cylindrical section 28 is surrounded with a series of thin, heat exchange, metal fins 42 mounted transverse to the axis of the recess 16. The fins 42 are preferably joined to the housing by brazing to insure an effective thermal path to the recess 16. The vertical ends of the fins may be joined to sideplate members, not shown. The fins may extend past and around the sidewalls to surround the lasing cavity 14 to provide additional path to remove heat from the cavity. The horizontal ends 44 of the fins 42 are left open to provide transverse flow of ambient coolant across the recess 16. A top plate 46 may be provided surrounding the fins 42. The top plate may be utilized to mount the unit to other assemblies or for mounting a fan for flowing ambient air passed the fins 42 so as to increase the rate of heat removal from he housing.

One of the end walls 24 of the housing contains a cylindrical threaded access port disposed opposite the recess for receiving an annular cover 30. A pressure relief valve 32 is mounted in the core 34 of the annular cover 30. The valve 32 extends outwardly through the core and inwardly into passage 18 of the closed loop. The valve 32 is mounted in a valve seat and support member 36. The other end wall 26 of the housing also contains a threaded recess for receiving an annular access cover 38. A trigger transformer 40 may be mounted just inside cover 38 so that it extends into the passage 20 of the closed-loop circuit.

An annular heat exchanger and pump assembly is mounted in the recess 16. The assembly is formed of an inner cylinder 48 and an outer concentric cylinder 50. The annulus 52 between the cylinders contains a longitudinally corrugated fin structure 53 brazed to the inner and outer cylinders 48, 50. A motor 54 is disposed within the internal cylinder 48 and is connected to a drive shaft 56 which extends through an end wall 58 of the cylinder 48. The shaft is connected within the internal passage 18 to a coolant impeller 60. The impeller 60 is preferably an axial flow, turbine-type impeller.

The bottom wall 22 of the housing 10 forms an optical bench for supporting a portion of the laser optics. The cavity 14 includes a laser rod 62 and a laser pump source 64, both mounted within an internally reflective envelope 66, to form a light-pumping cavity for the laser. One end of the laser pump source 64 is inserted into a socket 68 formed in an end member 70 of the envelope. A second socket 72 is supported on an arm 74 extending into the cavity 14. End member 70 contains an optically aligned aperture 76 behind which is disposed an output coupler 78 which is mounted in a threaded bore provided in end wall 24. The opposite end wall of the housing contains an annular, removable threaded cover plate 80. The core of the plate 80 is threaded to receive a window element 82. The Q-switching module 83 is adapted to be connected to the cover plate 80. Cover plate 80 also provides an access to the cavity 14 for changing flash tube 64 or for removing and replacing the modular reflective envelope member 66 which lines the cavity 14.

The thermal energy developed in the optical cavity during repetitive firing of the laser flashtube 64 is dissipated and removed from the cavity 14 by means of the circulating coolant. The coolant is pumped from the cavity 14 by means of the internal coolant motor 54. The circulating coolant transfers heat to the internal fins 53 of the annular heat exchanger. The fins 53 in turn conduct heat through the wall of the external cylinder 50 to the walls of the housing and then to the external fins 42. The external fins loose heat by convection to the ambient coolant. The lasing cavity is cooled without the necessity of interconnecting pipes or tubes and cooling is conducted efficiently, uniformly in a compact and convenient lightweight, modular package.

The ambient or secondary coolant may be gas or liquid and may operate by convection or may be forced through the external fins 42 by means of an ambient coolant pump, not shown. Suitably the ambient coolant is air. The internal coolant should be chemically inert, optically transparent and nonconducting. The coolant fluid may be liquid such as water or a fluorocarbon liquid, for example FC104 (3M), or may be a gas such as air, argon helium or nitrogen. MAny operating and design advantages are obtained by compressing the coolant gas such as nitrogen suitably to about 10 to 30 atmospheres and operating the closed-loop system with the gas in the compressed state.

With the use of compressed gas incidental equipment required with circulating liquids such as filters, neutralizers, deionizers and expansion chambers may be eliminated. The corrosion and optical degradation associated with the use of liquid coolants result in a considerable decrease in reliability and greatly increases requirements for maintenance. Furthermore, axial flow impellers which are suitable for use in pumping compressed gases are inherently much more reliable than liquid pumps. Furthermore, flashtube replacement in the presence of a liquid coolant is a wet-dripping process. Whereas with a compressed-gas coolant, the compressed-gas outlet valve 25 is simply opened to depressurize the system and a clean and dry flashtube is removed and replaced. The system may then be simply repressurized to the desired operating level by use of gas inlet valve 23.

The heat transport capacity of compressed nitrogen is comparable to that of liquid laser coolants but the effects of temperature extremes such as freezing, boiling and expansion associated with liquid coolants are avoided. The compressed-gas coolants have proved to be very efficient and therefore have increased greatly the life of the flashtubes. The other advantages include freedom from chemical and ultraviolet dissociation, contamination, corrosion ionization and troublesome thermal expansion. The system utilizing a compressed gas coolant is free from chemical, ionic or particle filters and trouble-free operation is a significant factor in reducing maintenance while increasing reliability.

The operation of the device will be described in reference to FIG. 2 which is a schematic illustration of another embodiment of the invention employing a double-annular heat exchanger which provides longitudinal flow of ambient coolant gas past the heat exchanger recess. The orientation of the ambient coolant path is usually dictated by design requirements and the location of other assemblies. For example, the ambient coolant should not exhaust toward a blocked area, onto the operator or toward other subassemblies.

The laser-cooler in this embodiment includes a concentric coolant-ambient air heat exchanger 100 including an air pump 102 and a coolant pump 104 disposed within a closed loop 106. A laser cavity 108 forms the other portion of the loop 106. The optical apertures at the ends of the cavity 106 are closed by means of high-pressure windows 110. The flashlamp 112 laser rod 114 and reflector 115 form an optical pump assembly. These elements are housed within the laser cavity 108 and are mounted on the optical bench 116.

A Q-switch module 118 is mounted on the optical bench 116 on the optical axis of the laser rod 114. The Q-switch module 118 comprises a separately closed container 119 having an optical aperture 120. The Q-switch module includes in series a polarizer 122 mounted in the aperture 120, a Pockels cell 124 and a rear reflector 126. The output reflector 128 for the laser is mounted on the bench 116 opposite the other window 110. The output beam leaving the partially transparent output reflector 128 is deflected by beam splitter 130 through a beam expanding lens 132 to develop a laser output beam of a desired value.

The resonant end reflectors 126 and 128 and Pockels cell 124 must be in critical alignment and are thus rigidly mounted on the optical bench 116. The laser cavity 108 contains no critically aligned elements and can be counted on the optical bench as a removable and replaceable module. The Q-switch can be operated in the ¼-wave mode.

The secondary of the trigger transformer 134 is connected in series with the flashtube 112 to provide a fast, high-voltage trigger. The transformer 134 may be triggered by connecting a charged capacitor across the primary of the trigger transformer. The Q-switch control 136 provides a high voltage pulse to the Pockels cell at the appropriate time in the flashlamp pumping cycle to initiate Q-switch action. A photodetector may be positioned to detect the presence of a laser beam and this signal may be applied to a trigger logic unit 140 to initiate a repetition of the firing sequence.

The use of functional modular construction simplifies fault isolation and repair greatly reducing equipment down time with a given level of maintenance skills. It also allows incorporation of improvements with less effect on overall redesign.

Other modes of flow are also permissable. Referring now to FIG. 3, the internal coolant may also be transversely flowed across the lasing cavity. This type of flow would obviate the temperature gradient experienced with longitudinal flow of coolant along the lengths of the rod. The laser-cooler portion of the system would again include an integral housing 201 defining a heat exchange recess 200, enclosing a finned heat exchanger material 216, laser cavity 202 and connecting channels 203 and 204. The channels 203 and 204 are connected to manifolds 206 and 208 extending along the length of the laser cavity 202. The laser cavity reflector 210 contains openings 211 opposite the manifolds for permitting flow of coolant across the cavity. The laser rod 212 and flashlamp 214 are mounted within the reflector 210 so as to form a modular assembly.

The channels 202 and 204 which may extend the length of the laser cavity and may contain extensions of the annular heat exchanger finned material circulate the coolant through the heat exchanger recess 200. The recess contains an annular heat exchanger 216 enclosing a motor and impeller which could be of the squirrel cage type 218. The operation of the system is as described above.

FIG. 4 illustrates yet another mode of flow in which both laser and coolant impeller are concentric with the heat exchanger. This mode results in an integrated cylindrical module for combined lasing and cooling. The external housing 220 is covered with an extended surface or finned structure 221 for external convective, radiative or forced coolant cooling. The laser cavity 222, comprising a reflector 223, laser material 224, laser pump source 225 is in line with a coolant impeller 226, which may be of the squirrel cage type and a motor 227. Both said laser cavity and coolant impeller are concentric with a cylindrical annular heat exchanger 228 in contact with the interior of the external housing 220. In operation the coolant is circulated longitudinally through the laser cavity 222 by the coolant impeller 226 and the coolant is then passed in the opposite direction through the heat exchanger, 228, to the end of the housing 229 where flow is reversed back to the laser cavity. Reversal of impeller rotation could reverse flow direction with no essential impairment of operation.

It is to be understood that only preferred embodiments of the invention have been disclosed and that numerous substitutions, alterations and modifications are all permissable without departing from the spirit and scope of the invention.

What is claimed is:

1. A system for cooling a laser comprising
    modular housing means formed of an integral structure and having first and second substantially parallel tubular recesses therein each with first and second ends, and each with a longitudinal axis, said first recess including an optical laser cavity and said second recess including a heat exchanger portion,
    first and second means positioned respectively at the first and second ends of said recesses and including first and second paths for interconnecting said recesses to form a closed loop having a circulating gas coolant under pressure therein,
    longitudinal fin means positioned annularly around the internal circumference of said heat exchanger portion for transferring heat from the circulating gas coolant in said second recess to said housing means, and coolant circulation means coaxially positioned in said second recess for circulating said gas coolant through said closed loop.

2. The combination of claim 1 in which heat exchanger fins are provided around the housing means at least in an area substantially including said heat exchanger recess for receiving heat from the heat exchanger portion.

3. The combination of claim 1 in which a longitudinal laser rod and flashtube are provided in said laser cavity, electronic means are provided to control said flashtube, optical switching means is provided at a first end of said first recess coaxial with said laser rod, and window means is provided at a second end of said first recess substantially coaxial with said laser rod.

4. The combination of claim 3 in which access means are provided at said first end of said laser cavity.

5. The combination of claim 1 in which said gas coolant is compressed nitrogen gas.

6. A laser system comprising a modular housing structure including a closed-loop path therein for circulating a pressurized gas coolant, said closed-loop path including a first and a second tubular recess each having a longitudinal linear axis substantially parallel to each other, said first recess including an optical resonant cavity, and said second recess forming a cooling cavity, an annular finned heat exchange structure positioned in said cooling cavity in contact with the inner surface thereof, coolant-circulating means positioned substantially entirely in the cooling cavity for circulating said coolant under pressure through said annular finned structure and through said optical resonant cavity, a laser rod having a longitudinal axis and positioned in said optical resonant cavity with the axis of said rod substantially parallel to the longitudinal axis of said optical resonant cavity, window means provided in said housing structure at a first end optical resonant cavity to pass an output beam from said laser rod external to said housing structure, and removable laser Q-switching means attached to said structure at the other end of said optical laser cavity and having an optical axis parallel with the longitudinal axis of said optical resonant cavity and coincident with the axis of said rod.

7. The combination of claim 6 in which said annular finned structure includes longitudinal annular fins mounted to the annular surface of said cooling cavity.

8. The combination of claim 7 in which an external finned heat exchanger is mounted on the surface around said modular housing structure including said cooling and laser cavities.

9. A laser cooling system including the following elements integrated in a single modular unit, housing means defining a closed loop having a path for circulating a coolant, a laser cavity having a longitudinal axis, said laser cavity having first and second elongated openings therealong substantially parallel to said longitudinal axis for forming a portion of the loop, said longitudinal axis being substantially orthogonal to the path of said loop, a heat exchanger recess forming a portion of said loop, and coolant circulation means disposed within said loop for circulating the coolant through said recess and said laser cavity.

* * * * *